US009864896B2

(12) United States Patent
Christie

(10) Patent No.: US 9,864,896 B2
(45) Date of Patent: Jan. 9, 2018

(54) MULTI-LINED SENSOR

(71) Applicant: IDEX ASA, Fornebu (NO)

(72) Inventor: Nicolai W. Christie, Hosle (NO)

(73) Assignee: IDEX ASA, Fornebu (NO)

( * ) Notice: Subject to any disclaimer, the term of this patent is extended or adjusted under 35 U.S.C. 154(b) by 129 days.

(21) Appl. No.: 14/721,231

(22) Filed: May 26, 2015

(65) Prior Publication Data

US 2015/0347809 A1 Dec. 3, 2015

(30) Foreign Application Priority Data

May 27, 2014 (NO) .................................... 20140653

(51) Int. Cl.
*G06K 9/00* (2006.01)
(52) U.S. Cl.
CPC ....... *G06K 9/00026* (2013.01); *G06K 9/0004* (2013.01)
(58) Field of Classification Search
USPC .................. 382/107, 115, 120, 122, 124, 125
See application file for complete search history.

(56) References Cited

U.S. PATENT DOCUMENTS

| | | | | |
|---|---|---|---|---|
| 5,920,063 A * | 7/1999 | Kawamoto | ........... | H04N 1/1912 250/208.1 |
| 6,002,815 A * | 12/1999 | Immega | ............... | H04N 1/0473 235/439 |
| 6,289,114 B1 | 9/2001 | Mainguet | | |
| 6,333,989 B1 * | 12/2001 | Borza | .................. | G06K 9/0002 250/556 |
| 6,785,407 B1 | 8/2004 | Tschudi et al. | | |

(Continued)

FOREIGN PATENT DOCUMENTS

| | | |
|---|---|---|
| EP | 0988614 A1 | 3/2000 |
| EP | 1328919 A1 | 7/2003 |
| EP | 1353294 A1 | 10/2003 |

OTHER PUBLICATIONS

International Search Report and Written Opinion issued in International Patent Application No. PCT/IB2015/000747, 11 pages (dated Oct. 2, 2015).

(Continued)

*Primary Examiner* — Andrew Moyer
*Assistant Examiner* — Narek Zohrabyan
(74) *Attorney, Agent, or Firm* — Rothwell, Figg, Ernst & Manbeck, P.C.

(57) ABSTRACT

A biometric sensor device for measuring structures and properties of an object of organic tissue, especially a fingerprint sensor, includes a plurality of linear sensing arrays adapted to generate a respective plurality of measurement data at a predetermined sampling rate for a predetermined time period, based upon a sliding movement of the organic tissue over the plurality of linear sensing arrays, and a processor adapted to generate a partial image of the organic tissue from each of the respective plurality of measurement data. The processor is further adapted to generate a complete image of the organic tissue by combining the partial image generated from each of the plurality of measurement data, wherein the complete image is larger than each of the partial images, and the predetermined time period is defined so as to measure a section of said organic tissue given by the distance between two linear arrays.

17 Claims, 2 Drawing Sheets

(56) References Cited

U.S. PATENT DOCUMENTS

| | | | |
|---|---|---|---|
| 7,054,471 B2 | 5/2006 | Tschudi et al. |
| 7,110,577 B1 | 9/2006 | Tschudi |
| 7,190,816 B2 | 3/2007 | Mitsuyu |
| 7,197,168 B2 | 3/2007 | Russo |
| 7,200,250 B2 | 4/2007 | Chou |
| 7,333,639 B2 | 2/2008 | Tschudi |
| 7,369,684 B2 | 5/2008 | Hamid et al. |
| 7,734,074 B2 | 6/2010 | Setlak et al. |
| 7,864,992 B2 | 1/2011 | Riedijk et al. |
| 8,005,275 B2 | 8/2011 | Mathiassen et al. |
| 2004/0234110 A1 | 11/2004 | Chou |
| 2006/0182319 A1 | 8/2006 | Setlak et al. |
| 2007/0154073 A1 | 7/2007 | Hamid et al. |
| 2008/0205714 A1 | 8/2008 | Benkley et al. |
| 2009/0279749 A1 | 11/2009 | Irving et al. |
| 2010/0284565 A1 | 11/2010 | Benkley et al. |
| 2013/0108125 A1 | 5/2013 | Storm et al. |

OTHER PUBLICATIONS

Search Report issued in Norwegian Patent Application No. 20140653, 2 pages (dated Dec. 23, 2014).
Written Opinion of the International Preliminary Examining Authority issued in International Patent Application No. PCT/IB2015/000747, 6 pages (dated May 2, 2016).
International Preliminary Report on Patentability issued in Application No. PCT/IB2015/000747 dated Sep. 8, 2016.

* cited by examiner

MULTI-LINED SENSOR

CROSS REFERENCE TO RELATED APPLICATION

This application claims the benefit under 35 U.S.C. §119 of the filing date of Norwegian patent application no. 20140653 filed May 27, 2014, the disclosure of which is incorporated herein by reference.

FIELD OF THE DISCLOSURE

This disclosure relates to a biometric sensor device for measuring structures and properties of an object of organic tissue, especially a fingerprint sensor.

BACKGROUND

There are, in general, two types of fingerprint sensors, swipe/sweep sensors and area/placement sensor. Swipe sensors can be manufactured at lower cost than placement sensors as the sensing area of a swipe sensor is smaller than that of a placement sensor. Fewer interconnects, smaller sensor substrates, smaller ASIC (application-specific integrated circuit), etc. contribute to the lower cost of swipe sensors relative to placement sensors. Swipe sensors, however, are considered less user-friendly than placement sensors. This is mainly due to the fact that some training of the user on how to swipe the finger across the swipe sensor is necessary. For a placement sensor, on the other hand, the finger is simply laid over, or placed on, the sensor, which might be more intuitive to the user. The downside of placement sensors is the need for more complex electronics due to the many more sensing elements, leading to larger ASICS and more complex interconnects, and hence higher cost.

European Patent Publication EP1353294 and U.S. Pat. No. 7,190,816 describe a system utilizing a sweep fingerprint sensor where the finger is registered in the system in the normal way, by making a full finger swipe. The swipe sensor can thereafter be used in a strict authentication mode and an easy authentication mode. In the strict authentication mode the finger needs to perform a full swipe to fulfill the authentication, while in the easy authentication mode the finger might lay still on the swipe sensor and an image of only a small part of the fingerprint is generated. The small image is used to authenticate the user with a lower security level, suitable for releasing a dial lock or other low-security level activity.

U.S. Pat. No. 7,369,684 describes a system using multiple sweep sensors in which each sweep sensor has multiple linear sensing arrays. The linear sensing arrays of the first sweep sensor have a first regular spacing, the linear sensing arrays of the second sweep sensor have second regular spacing, which may be identical to the first regular spacing, and the multiple sweep sensors are spaced apart such that the spacing between them is other than an integer multiple of the first known spacing. The idea of this patent is to use multiple sweep sensor to increase the resolution of the image, hence the importance of the non-integer multiple of the spacing between them. Each sweep sensor of this application is a multi-line sweep sensor, as would be required for image stitching as described therein.

U.S. Pat. No. 7,734,074 describes using a plurality of linear finger sensing arrays in order to generate a respective plurality of finger image data sets, determining the movement of the finger based upon the finger image set, generating a resampled finger image data set based on the finger movement by arranging the plurality of finger image data sets into a single array to generate a supersampled finger image data array having a resolution greater than a resolution of each finger image data set, and then downsampling the supersampled finger image data array to generate a downsampled finger image data array having a resolution lower than the resolution of the supersampled finger image data array and thereby defining the resampled finger image data set. The patent states that this is in contrast to approaches that use various types of finger speed sensors to control the sampling rate or discard repeated data, such as disclosed, for example, in U.S. Pat. No. 6,002,815, or use cross-correlation between partially overlapped image frames to eliminate redundant data and stitch the data together into a single global image, such as disclosed in U.S. Pat. No. 6,289,114.

Based on the discussion above a benefit may be achieved by providing a sensor system that combines the low cost of the swipe sensor system with the user friendliness of the placement sensor. This is obtained as stated in the accompanying claims.

The invention will be described more in detail below with reference to the accompanying drawings, illustrating the invention by way of examples.

DETAILED DESCRIPTION

Figure 1:
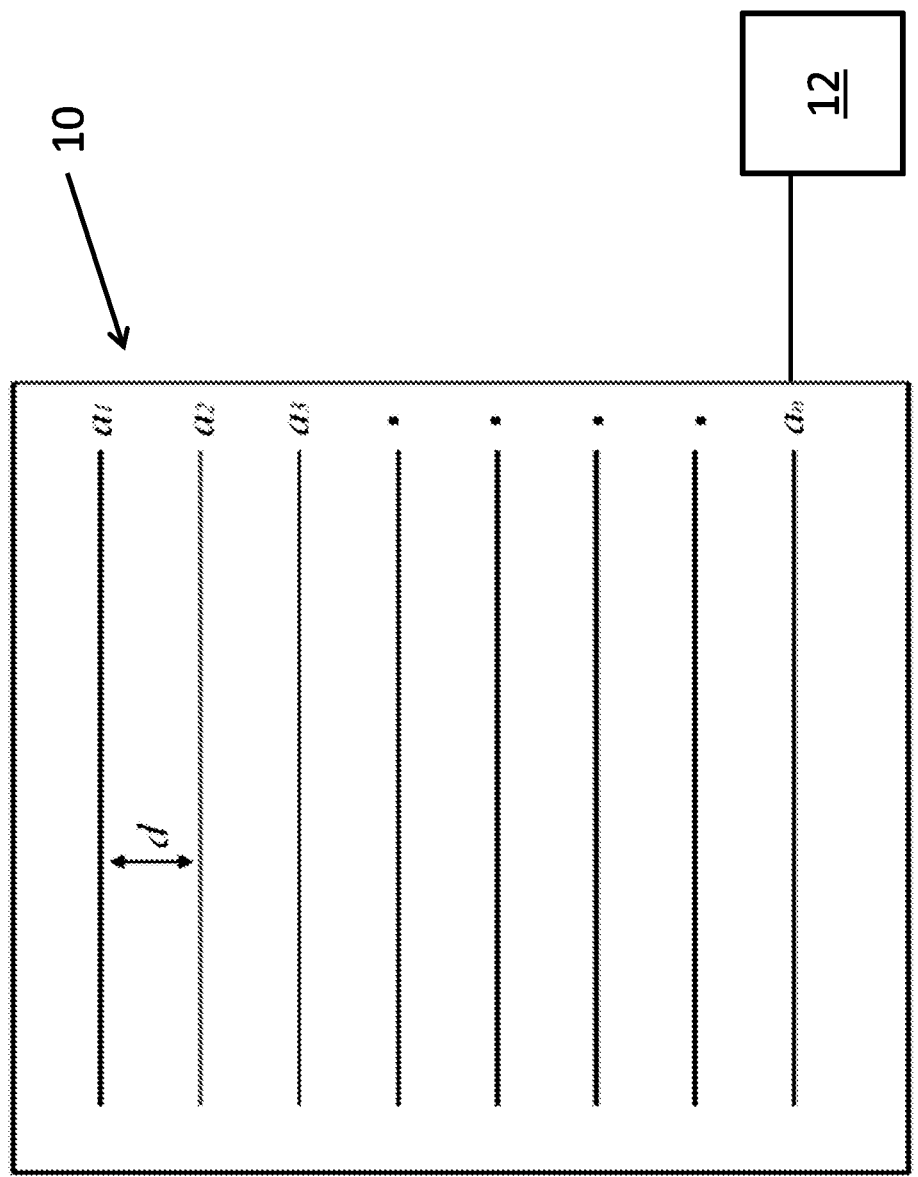
FIG. 1 is a schematic view of an exemplary sensor as described herein.

As illustrated in FIG. 1 the present invention relates to a biometric sensor device 10 with a limited number of swipe sensor arrays $a_1$-$a_n$, where n corresponds to the number of swipe sensor arrays or linear sensing arrays, typically in the range of 4-12 arrays. These arrays $a_1$-$a_n$ are spaced a few millimeters d apart such that the arrays cover a typical fingerprint placement sensor area, e.g., 6×6 mm$^2$, 8×8 mm$^2$, 10×10 mm$^2$ or 10×12 mm$^2$. The arrays may be arranged in a rectangular configuration as shown or in other shapes beneficial to the particular application. The distance d is typically larger than a typical feature of an organic tissue to be measured, typically less than 5 mm, preferably less than 2 mm. Though the sensor arrays $a_1$-$a_n$ are shown as equidistant, the distance d between two arrays may in an alternative embodiment vary between the different pairs of sensor arrays. One exemplary configuration as illustrated in FIG. 1 comprises eight sensor arrays separated by a distance d=1.5 mm.

Each of the individual swipe sensor arrays $a_1$-$a_n$ may be of any suitable type already known by the person skilled in the art. Each swipe sensor array may comprise a single sensor line or may comprise multiple sensor lines. A swipe sensor array, e.g., as described in EP0988614, would typically have one or two sensor lines per swipe sensor array, while a sensor array, e.g., as described in U.S. Pat. No. 6,289,114 and U.S. Pat. No. 7,864,992, typically would have more than three sensor lines per swipe sensor array. At least one of the sensor arrays of the biometric sensor device may be provided with means for measuring the velocity, i.e., speed and direction, of the organic tissue over the sensor as either an integral part of the sensor array, e.g., as described in EP0988614, or the sensor array may comprise separate velocity measurement sensors.

In the following description, the object of organic tissues is described as a finger surface or finger. The biometric sensor device 10 is not, however, limited to sensing fingerprints, but all organic tissues that could be measured by the biometric sensor device, such as palm print, knuckle print, ear pattern, etc.

In an exemplary embodiment, to use the biometric sensor device 10, the user places the finger on the sensor array and performs a very short swipe in the direction essentially perpendicular to the individual sensor array, typically only a few millimeters, depending on the distance d. The distance of the finger movement necessary to cover a desired portion of the fingerprint thus corresponds to the distance d between the swipe sensor arrays. In the case of the alternative embodiment where the distances d between the swipe sensor arrays were not equidistant, the necessary finger movement would be similar to the largest distance d.

Each sensor array generates a plurality of measurement data, preferably at a predetermined sampling rate, as the finger is swiped over the swipe sensor array. The sampling rate may in one exemplary embodiment be specified so as to obtain a desired image resolution for a predetermined maximum velocity of finger swiped over the swipe sensor arrays.

In a first step, a processor 12, e.g. in an ASIC, generates a set of first images of the finger from each of the plurality of measurement data. This first step of generating a first set of images might be performed using any suitable method. One such method is to calculate or measure the velocity of the finger to determine the relative positioning of the plurality of measurement data to form a two-dimensional image of the finger. Another such method is to use overlapping parts of the plurality of measurement data to form the two dimensional image of the finger. As the finger performed a very short swipe, the images from the first set of images would not contain a complete fingerprint. Hence, the first set of images consists of a set of partial images of the fingerprint surface. In a next step, the processor 12 combines the partial images generated from each of the plurality of measurement data to generate a complete image of the finger surface, where the complete image of the finger surface is larger than each of the partial images, typically a factor of n larger than the size of the partial images. In this way, the complete image of the organic tissue may be obtained based on a sliding movement n times smaller than the dimension of the complete image.

Figure 2:
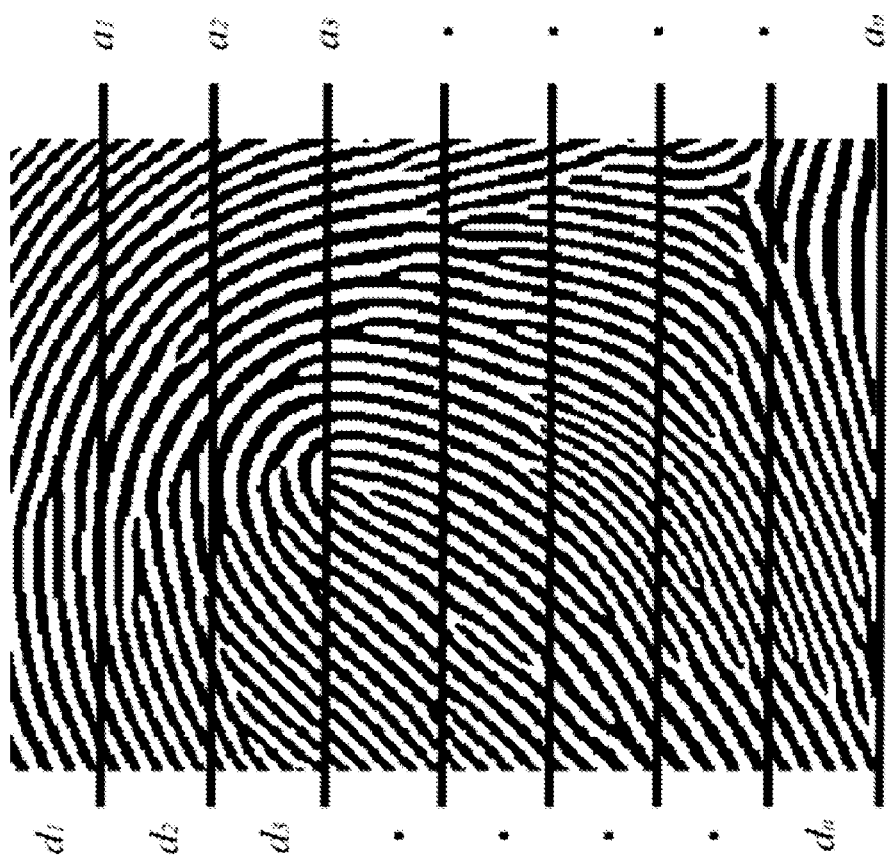
FIG. 2 is a fingerprint as measured by a sensor as described herein.

FIG. 2 illustrates a finger surface measured by a biometric sensor device as described herein, where $a_1$-$a_n$ illustrates the positions of the sensor arrays in relation to the respective partial images $d_1$-$d_n$ measured by the sensor array.

In order to reduce the processing needs of the biometric sensor device it would be preferable only to scan each part the finger once. By measuring the velocity of the finger the scanning may be stopped when the finger has moved a distance substantially corresponding to the distance between the scanning lines. Alternatively, the sensor may be provided with means for detecting when the finger has moved a certain distance. Accordingly, the scanning rate and/or period may be adjusted according to the velocity of the finger relative to the sensors. Alternatively, the measurements may continue but only the data scanned during the distance $d_1$-$d_n$ between the lines $a_1$-$a_n$ are used.

As the user may swipe the finger slightly off axis relative to the scanning direction the system may include measuring means for measuring the direction, thus providing means for correcting the sampled data. This may be performed as described in EP1328919 by combining and correlating the signals from sensors on a two dimensional surface.

While the invention has been illustrated and described in detail in the drawings and forgoing description, such illustration and description are to be considered illustrative or exemplary and not restrictive and is not intended to limit the invention to the disclosed embodiments. The mere fact that certain features are recited in mutually different dependent claims does not indicate that a combination of these features cannot be used advantageously. Any reference signs in the claims should not be construed as limiting the scope of the invention.

The invention claimed is:

1. A biometric sensor device for measuring features of an object of organic tissue, said device comprising:
    a plurality of spaced-apart, linear sensor arrays, each sensor array generating a plurality of measurement data during a sliding movement of the organic tissue over the plurality of linear sensor arrays, wherein the plurality of measurement data is generated at a specified sampling rate for a specified time period corresponding to movement of a section of the organic tissue over a distance corresponding to a spacing between adjacent linear sensor arrays; and
    a processor to generate partial images of the organic tissue, wherein each partial image corresponds to one of the linear sensor arrays and is generated from the measurement data generated by the corresponding linear sensor array, and to combine the partial images to generate an image of the organic tissue for measuring features of the object of organic tissue, such that the image of the organic tissue is generated by a movement of the organic tissue over a distance corresponding to the spacing between adjacent linear sensor arrays, wherein the distance of the movement of the organic tissue is less than the length of the organic tissue.

2. The biometric sensor device of claim 1, comprising between 4 and 12 linear sensor arrays.

3. The biometric sensor device of claim 1, wherein the plurality of linear sensor arrays are arranged in a rectangular configuration.

4. The biometric sensor array of claim 1, wherein the spacing between adjacent linear sensor arrays is in a range of 1.5 mm to 5 mm.

5. The biometric sensor device of claim 1, wherein each linear sensor arrays comprises one or more sensor lines.

6. The biometric sensor device of claim 1, wherein the linear sensor arrays are equidistantly spaced apart or not equidistantly spaced apart.

7. The biometric sensor device of claim 1, further comprising a velocity sensor to measure the velocity of the organic tissue movement over the plurality of linear sensor arrays.

8. The biometric sensor device of claim 7, wherein said velocity sensor comprises sensors disposed in adjacent sensor line adjacent to a linear sensor array and spaced therefrom in the slide direction.

9. The biometric sensor device of claim 7, wherein the device stops generating measurement data when the organic surface has moved a distance substantially corresponding to the spacing between linear sensor arrays as determined from by the velocity sensor.

10. The biometric sensor device of claim 7, wherein the device adjusts at least one of the sampling rate and the time period based on the velocity.

11. A method for measuring features of an object of organic tissue, said method comprising:

A. generating a plurality of measurement data using each of a plurality of linear sensor arrays during movement of a section of the organic tissue over a distance corresponding to a spacing between adjacent linear sensor arrays;
B. generating partial images of the organic tissue, wherein each partial image corresponds to one of the linear sensor arrays and is generated from the measurement data generated by the corresponding linear sensor array; and
C. combining the partial images to generate a complete image of the organic tissue for measuring features of an object of organic tissue, wherein the plurality of measurement data for each linear sensor array is generated at a specified sampling rate for a specified time period corresponding to movement of a section of the organic tissue over a distance corresponding to the spacing between adjacent linear sensor arrays, such that the image of the organic tissue is generated by a movement of the organic tissue over a distance corresponding to the spacing between adjacent linear sensor arrays, wherein the distance of the movement of the organic tissue is less than the length of the organic tissue.

12. The method of claim 11, further comprising measuring the velocity of the sliding movement of the organic tissue over the plurality of linear sensor arrays.

13. The method of claim 11, further comprising terminating step A when the organic surface has moved a distance substantially corresponding to the spacing between linear sensor arrays.

14. The method of claim 11, further comprising:
measuring the velocity of the sliding movement of the organic tissue over the plurality of linear sensor arrays; and
adjusting at least one of the sampling rate and the time period based on the velocity.

15. The method of claim 11, wherein step B is performed by determining the velocity of the finger to determine the relative positioning of the plurality of measurement data to form a two-dimensional image of a portion of the organic tissue.

16. The method of claim 11, wherein step B is performed by using overlapping parts of the plurality of measurement data to form the two dimensional image of the finger.

17. The method of claim 11, wherein the organic tissue is a finger and the features are fingerprints.

* * * * *